United States Patent [19]
Keil et al.

[11] Patent Number: 4,987,217
[45] Date of Patent: Jan. 22, 1991

[54] WHOLLY AROMATIC POLYAMIDE

[75] Inventors: Günter Keil, Hofheim am Taunus; Karl Heinrich, Grossaitingen; Peter Klein, Wiesbaden, all of Fed. Rep. of Germany

[73] Assignee: Hoechst Aktiengesellschaft, Frankfurt am Main, Fed. Rep. of Germany

[21] Appl. No.: 422,116

[22] Filed: Oct. 16, 1989

[30] Foreign Application Priority Data

Oct. 18, 1988 [DE] Fed. Rep. of Germany ....... 3835405

[51] Int. Cl.$^5$ ............................................. C08G 69/32
[52] U.S. Cl. .................................... 528/340; 528/180; 528/183; 528/184; 528/185; 528/336; 528/348
[58] Field of Search ............... 528/340, 348, 336, 180, 528/183, 184, 185

[56] References Cited

U.S. PATENT DOCUMENTS

| | | | |
|---|---|---|---|
| 3,318,849 | 5/1967 | Mosley, Jr. et al. | 260/77.5 |
| 3,600,350 | 8/1971 | Kwolek | 260/32.6 |
| 3,671,542 | 6/1972 | Kwolek | 260/30.8 |
| 3,767,756 | 10/1973 | Blades | 264/184 |
| 3,801,545 | 4/1974 | Kunzel et al. | 260/47 |
| 3,819,587 | 6/1974 | Kwolek | 260/78 |
| 3,888,965 | 6/1975 | Kwolek | 264/342 |
| 4,075,172 | 2/1978 | Ozawa et al. | 260/47 |
| 4,413,114 | 11/1983 | Shimada et al. | 528/183 |
| 4,847,354 | 7/1989 | Keil et al. | 528/340 |

FOREIGN PATENT DOCUMENTS

| | | |
|---|---|---|
| 569760 | 7/1958 | Belgium . |
| 1929713 | 2/1970 | Fed. Rep. of Germany . |
| 2144126 | 3/1973 | Fed. Rep. of Germany . |
| 2219703 | 1/1975 | Fed. Rep. of Germany . |
| 2556883 | 7/1976 | Fed. Rep. of Germany . |
| 3510655 | 9/1986 | Fed. Rep. of Germany . |
| 3605394 | 8/1987 | Fed. Rep. of Germany . |

Primary Examiner—Harold D. Anderson

[57] ABSTRACT

Aromatic copolyamides, soluble in organic polyamide solvents, comprise at least 95 mol % of the recurrent structural units of the formulae

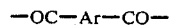

A

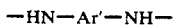

B

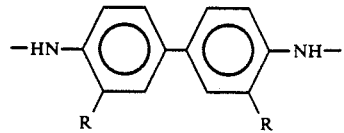

C

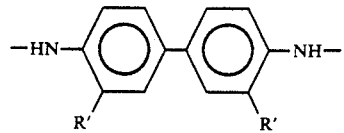

D and up to 5 mol % of structural units containing m-bonds. —Ar— and —Ar'— are here divalent, unsubstituted or substituted aromatic radicals, the valency bonds of which are in the para-position or in a comparable coaxial or parallel position, and —R and —R' are different from one another and are lower alkyl radicals or lower alkoxy radicals.

12 Claims, No Drawings

WHOLLY AROMATIC POLYAMIDE

DESCRIPTION

The invention relates to novel, wholly aromatic polyamides of the dicarboxylic acid/diamine type, which can be spun from their solutions in organic solvents, and to shaped structures produced from the, such as filaments, fibers, fiber pulp, films, sheets and membranes of very high initial modulus (modulus of elasticity), and also to processes for preparing them.

As is known, aromatic polyamides (polyaramides) are raw materials of high thermal and chemical stability and low inflammability. Thus, for example, fibers and films of such raw materials show very good mechanical properties, such as a high strength and high initial modulus (modulus of elasticity), and are very suitable for fields of application in industry—for example for reinforcing plastics or as filter materials.

The preparation of the polymers required for this purpose is best carried out in a known manner by reacting aromatic diamines with aromatic dicarboxylic acid dichlorides in aprotic organic solvents of the amide type (N,N-dimethylacetamide, N-methylpyrrolidone, N,N,N', N'-tetramethylurea and the like)—if necessary in the presence of calcium halides or lithium halides——and neutralizing the hydrogen chloride formed, for example with calcium oxides.

Polyaramides of high strength and high initial modulus are those in which the amide bonds on the aromatic nuclei are mutually oriented coaxially or almost parallel, whereby rigid, rod-like polymer molecules are formed.

An example of a typical polyamide of this type is poly(p-phenyleneterephthalamide). Filaments of this material have been described, for example, in German Pat. No. 2,219,703.

This polyamide has a number of advantages, but its preparation and its processing are very difficult. Because of the poor solubility in polar organic solvents—and in particular also in the presence of inorganic salts such as calcium chloride or lithium chloride as solubilizers—this polymer already precipitates from the reaction medium shortly after it has been formed. It must be isolated, washed, dried and then redissolved in a spinning solvent. The preferred solvent for preparing the spinning solutions is concentrated sulfuric acid, which causes special problems in handling (occupational safety, corrosion) and waste disposal.

Attempts have therefore been made to avoid these difficulties by developing copolyamides which have good solubility in the known amide solvents and which can also be readily spun and the filaments of which are distinguished, after drawing, by high strength values and initial moduli.

Thus, for example in DE-A-2,144,126, the preparation of soluble aromatic polyamides of high modulus of elasticity was described, according to which substituted 3-(p-aminophenoxy)-4-aminobenzanilides give, with terephthaloyl chloride, readily soluble polyamides which can be spun and drawn to give filaments of good strengths and initial moduli.

The increased solubility is here caused by the metaorientation and the oxygen bridge atom.

In German Pat. No. 2,556,883 and in German Offenlegungsschrift No. 3,007,063, copolyamides of terephthalic acid, p-phenylenediamine and 3,4'-diaminodiphenyl ether are described which, in amide solvents, give isotropic solutions which can readily be spun. The filaments are provided with high strengths and moduli by very extensive drawing. A disadvantage in the two abovementioned processes is that the required unsymmetrical diamines can be prepared and purified only by very involved processes.

For this reason, terephthalamides with 3 diamine components in certain defined fractions are described in German Offenlegungsschriften Nos. 3,510,655 and 3,605,394 or in European patent aplication No. 0,199,090, respectively, which are readily soluble in amide solvents and, by deformation, give filaments or films of very good strengths and moduli.

Because of the content of non-aromatic chain constituents, as —O— or —CH$_2$— groups, the moduli described in the last mentioned publications—up to 68 N/tex is mentioned in German Offenlegungsschrift No. 3,510,655, and up to 79 N/tex in German Offenlegungsschrift No. 3,605,394—are not yet sufficiently high for certain intended applications.

Filaments of the abovementioned poly-(p-phenyleneterephthalamide) described in German Pat. No. 2,219,703 reach moduli of up to 99 N tex only after an expensive thermal aftertreatment (cf. also U.S. Pat. No. , 3,767,756, column 11, and German Pat. No. 2,219,703, page 14).

The present invention is therefore based on the object of providing aromatic copolyamides of a type which can be converted with the use of amide solvents into shaped structures which are then distinguished by a number of physical properties. In the production of filaments and fibers, in particular high strengths and very high initial moduli should be achievable after appropriate drawing steps. The monomers required for preparing the copolyamides should be readily accessible, and the polymer solutions obtained by the polycondensation should be capable of spinning or shaping directly after a filtration process and appropriate degassing.

Novel aromatic copolyamides have not bee found which are composed predominantly of para-substituted aromatic chain constituents and, surprisingly, are nevertheless soluble in amide solvents and can be processed from these solutions to give shaped structures such as filaments, fibers, fiber pulp and films or sheets. These copolyamides comprise at least 95 mol %, preferably 100 mol %, of the following recurrent—exclusively rigid—structural units

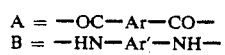

A = —OC—Ar—CO—
B = —HN—Ar'—NH—

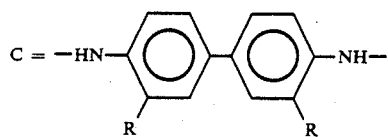

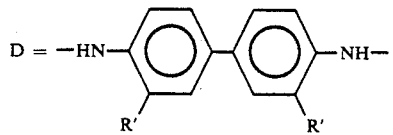

and up to 5 mol % of structural units E and/or F which contain m-bonds and are derived from aromatic dicarboxylic acids (E') and/or from aromatic diamines (F'), the total of the mol fractions of the structural units A+E and the total of the mol fractions of the structural units B+C+D+F being substantially the same.

In these formulae

—Ar— and —Ar'— are divalent aromatic radicals, the valency bonds of which are in the para-position or in a comparable coaxial or parallel position and which may be substituted by one or two inert radicals such as lower alkyl or halogen, and —R and —R' are different from one another and are lower alkyl radicals or lower alkoxy radicals.

The valency bonds which are in a coaxial or parallel position, point in opposite directions. An example of coaxial bonds pointing in opposite directions are the naphthylene 1,4-bonds. Examples of parallel bonds pointing in opposite directions are, for example, naphthalene 1,5- or 2,6-bonds, whereas the naphthalene 1,8-bonds point in the same direction in parallel.

Divalent aromatic radicals representing —Ar—, in which the valency bonds are in the para-position or in a comparable coaxial or parallel position, are mononuclear or dinuclear fused aromatic radicals such as, for example, 1,4-phenylene, 1,4-naphthylene, 1,5-naphthylene, 2,6-naphthylene.

Divalent aromatic radicals representing —Ar'—, in which the valency bonds are in the para-position or a comparable coaxial or parallel position, are mononuclear or dinuclear fused aromatic radicals such as, for example, 1,4-phenylene, 1,4-naphthylene, 1,5-naphthylene and 2,6-naphthylene. 1,4-Phenylene is preferred for —Ar— and —Ar'—.

The radicals —Ar— and —Ar'— can be monosubstituted or disubstituted by lower alkyl radicals, i.e. straightchain or branched alkyl radicals having 1 to 4 carbon atoms, or by halogen, in particular by F, Cl or Br. Preferred alkyl substituents are straight-chain and are, in particular, methyl and ethyl. The preferred halogen substituent is chlorine.

The polyamides according to the invention can contain the unsubstituted radicals —Ar— and —Ar'— and the alkyl- and/or halogen-substituted radicals —Ar— and —Ar'— side by side in varying proportions.

The polyamide can here contain one type or several types of substituted radicals —Ar— and —Ar'—; for example, it can contain exclusively methyl-substituted —Ar— and/or —Ar'— radicals, or it can contain proportions of —Ar— and/or —Ar'— radicals with different alkyl substituents and/or with halogen substituents.

However, the polyamides according to the invention can also contain unsubstituted or substituted radicals —Ar— and —Ar'— exclusively. For cost reasons, those polyamides according to the invention are preferred which contain only unsubstituted radicals —Ar— or —Ar'— or such radicals substituted up to the extent of about 30 mol %.

Lower alkyl radicals and lower alkoxy radicals, which can be represented by —R and R', are likewise straight-chain or branched and have 1–4 carbon atoms. Preferably, R and R' are straight-chain radicals and especially radicals having 1–2 carbon atoms. Particularly preferably, R and R' are methyl and methoxy.

The radicals R and R' are different from one another. This means that R and R' can, for example, be two different alkyl radicals or two different alkoxy radicals. Preferably, however, the radicals R are alkyl radicals and the radicals R' are alkoxy radicals. In particular, R is methyl and R' is methoxy.

The structural units B, C and D originating from the diamines co-condensed into the polyamide are contained in the aromatic polyamides according to the invention only in the following defined mol percentage ranges, relative to the total quantity of components B, C and D:

Structural unit B: 20–30 mol %, preferably 25–30 mol %,
Structural unit C: 35–55 mol %, preferably 40–50 mol %,
Structural unit D: 15–40 mol %, preferably 25–30 mol %.

These mol % data here relate to the total quantity of the diamine structural units B, C and D.

In addition to the structural units with bonds in the para-position or comparable bonds pointing in opposite directions coaxially or in parallel, the polyamides according to the invention can have up to 5 mol %, relative to all the structural units, of structural units E and F containing m-bonds.

Within the meaning of the present invention, structural units E and F containing m-bonds are those which contain an aromatic nucleus, of which the bonds lying in the chain of the polymer molecule are in the m-position relative to one another.

Examples of such structural units are the radicals of isophthalic acid, m-phenylenediamine, 3,4'-diaminodiphenyl or alkyl- and/or alkoxy-substitution products thereof, or 3,4'- or 3',4-diaminobenzanilide.

It is self-understood to a person skilled in the art that the total of all the structural units (A+E) derived from aromatic acids and the total of all structural units (B+C+D+F) derived from aromatic amines are substantially equal, i.e. that they differ by about 1% as a maximum, preferably by 0.2% as a maximum, and especially that they are equal within the range of the measurements and metering which are possible in practice.

The aromatic polyamides according to the invention are soluble in polar organic aprotic solvents and can be processed directly from these solutions to give shaped structures.

The structures thus obtained are distinguished by a combination of very good technological properties.

In conjunction with the solubility in organic solvents and the economic and ecological advantages resulting therefrom, this processability represents an extremely valuable enrichment of technology in the field of wholly aromatic polyamides.

The outstanding technological properties of the shaped structures according to the invention are based on the incorporation of the amine components B, C and D within the limits indicated above. As can be seen from the comparative experiments described below, the technological properties deteriorate sharply outside the limits indicated.

The cited literature (German Offenlegungsschrift No. 3,510,655) shows that co-terephthalamides obtained from 50% of p-phenylenediamine plus 50% of 3,3'-dimethylbenzidine as well as those obtained from 50% of p-phenylenediamine and 50% of 3,3'-dimethoxybenzidine are sparingly soluble in aramide solvents and can not be spun (Comparative Experiments 1 and 4).

Aromatic polyaramides with one of the single amine components B, C and D are generally known.

Thus, it is known to use terephthalic acid radicals and p-phenylenediamine radicals for polyamides, for example from German Pat. No. 2,219,703 cited above. These products are virtually no longer soluble in amide solvents.

The use of benzidines is likewise known. Thus, it is shown in German Offenlengungsschrift No. 3,510,655 cited above, Comparative Example 6, that a terephthalamide of 3,3'-dimethylbenzidine is insoluble in amide solvents and can thus not be spun.

The use of 3,3'-dimethylbenzidine for the preparation of aramides is also cited in the following printed publications:
German Pat. No. 3,007,063, page 5, line 25,
Vysokomol. Soed. 12 (1970), No. 10, page 2185,
U.S. Pat. No. 3,318,849,
Belgian Pat. No. 569,760,
U.S. Pat. No. 3,671,542 and
U.S. Pat. No. 3,767,756,
P. W. Morgan: "Condensation Polymers", Intersci. Publ. 1965, page 180; Japanese Kokai Tokkyo Koho JP No. 55/71,751 (80/71,751), abstracted in CA 93 (16), 151120k, and Japanese Kokai JP No. 50/154/522 (72/154,522), abstracted in CA 84 (16), 106885s.

The use of 3,3'-dimethoxybenzidine is described, for example, in
DE-A 1,929,713,
J. Polym. Sci. B2, 369 (1964),
U.S. Pat. No. 3,671,542 and
Japanese Kokai Tokkyo Koho JP No. 55/71,751 (80/71,751), abstracted in CA 93 (16), 151120k.

As can be seen from the cited publications, the respective polyamides are in most cases insoluble in amide solvents, or the filaments spun from organic solvents shown only moderate properties.

By contrast, the polyamides of the present invention, which were prepared using mixtures of the amine components B+C+D in defined proportions, surprisingly are soluble in amide solvents and filaments spun from them show a high strength and a very high initial modulus.

The preparation of the aromatic polyamides according to the invention is carried out by solution condensation of aromatic dicarboxylic acid dichlorides with quantities, equivalent thereto, or mixtures of aromatic diamines in known polyamide solvents, i.e. in aprotic, polar solvents of the amide type such as, for example, in N,N-dimethylacetamide, tetramethylurea or especially in N-methyl-2-pyrrolidone. If appropriate, halide salts from the first and second groups of the periodic table can be added to these solvents in a known manner, in order to increase the solvent power or to stabilize the polyamide solutions. Preferred additives are calcium chloride and/or lithium chloride.

This salt addition can be made before the polycondensation or, advantageously, immediately after the addition of the acid chloride.

The polycondensation temperatures are usually between −20° C. and +120° C., preferably between +10° C. and +100° C. Particularly good results are obtained at reaction temperatures between +10° C. and +80° C. The polycondensation reactions are preferably carried out in such a way that, after completion of the reaction, 2 to 15 and preferably 5 to 10% by weight of polycondensate are present in the solution. Particularly good results are obtained in concentrations from 5.0 to 7.5 % by weight.

In the course of the polycondensation, the molecular weight of the polymer and hence also the viscosity of the reaction batch increase.

A sufficient length of the chain molecule has been reached when the viscosity of the polymer solution obtained in the polycondensation corresponds to an inherent viscosity of the polymer from about 5.0 to 9.0 dl/g.

Inherent viscosity is understood to mean the expression $$\eta_{inh} = \frac{\ln \eta_{rel}}{c}.$$

In this equation, $\eta_{rel}$ is the relative viscosity and c is the applied concentration in g/100 ml.

For the purposes of the present invention, it was determined on solutions of in each case 0.5 g of polymer in 100 ml of 98% by weight sulfuric acid at 25° C.

The process, sketched out and known per se, for the preparation of aromatic polyamides is, as far as it is used for preparing the aromatic polyamides according to the invention as described above, likewise a subject of the invention. This process according to the invention comprises reacting 95 to 100 mol % of acid chlorides of the formula

$$\text{Cl—OC—Ar—CO—Cl} \qquad (A')$$

and 0 to 5 mol % of aromatic dicarboxylic acid dichlorides (E') containing m-bonds with an equivalent quantity of a diamine mixture composed of 95–100 mol % of a mixture of diamines containing 20–30 mol %, preferably 25–30 mol %, of diamines of the formula

$$\text{NH}_2\text{—Ar'—NH}_2 \qquad (B')$$

35–55 mol %, preferably 40–50 mol %, of diamines of the formula

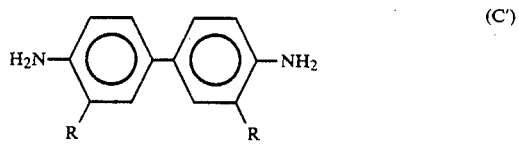

(C')

and 15–40 mol %, preferably 25–30 mol %, of diamines of the formula

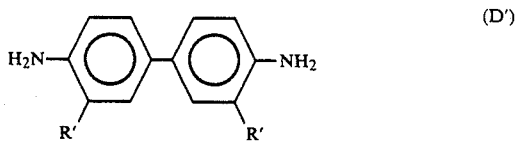

(D')

and of 0 to 5 mol % of aromatic diamines (F') containing m-bonds, in the manner indicated.

Aromatic dicarboxylic acid dichlorides containing m-bonds and aromatic diamines within the meaning of the present invention are those in which the directions of the bonds of the two carboxylic acid chloride groups and of the two amino groups form an angle between one another which corresponds to that of m-bonds. Examples of such dicarboxylic acid dichlorides and diamines, respectively, are isophthalic acid dichloride, m-phenylenediamine, 3,4'-diaminodiphenyl or alkyl- and/or alkoxy-substitution products thereof, or 3,4'- or 3',4-diaminobenzanilide.

In this procedure, the resulting polyamides according to the invention remain dissolved in the solvent.

When the polymer solution has reached the viscosity required for further processing, the polycondensation can be stopped in the usual manner by the addition of monofunctional compounds such as, for example, acetyl chloride. The hydrogen chloride, which has been formed and is loosely bound to the amide solvent, is then neutralized by the addition of basic substances. Lithium hydroxide and calcium hydroxide, but especially calcium oxide, are suitable for this purpose.

For producing shaped structures from the polyamides according to the invention, the resulting neutralized solutions of the polyamides according to the invention are filtered, degassed and further process in the known manner to give filaments, fibers, fiber pulp, films or also sheets, which are likewise a subject of the invention. This can be carried out, for example, by using a wet-spinning unit, where the polymer solution is extruded through suitable spinnerets into a coagulation bath, the resulting filaments are pulled through washing baths and drawn at a higher temperature. Suitable coagulation baths are aqueous solutions of the same amide solvent which was also used for preparing the polymer. However, aqueous salt solutions such as, for example, calcium chloride solutions can also be used.

When the polymer solutions are extruded and the shaped structures such as filaments or films are taken off out of the coagulation bath, only relatively slight wet drawing of these structures takes place. The structures taken off out of the coagulation baths must therefore be subjected to further drawing after the usual washing and drying, in order to confer on them the desired mechanical properties, such as a high modulus of the elasticity and a high tensile strength.

In the production of the filaments and fibers as well as films and sheets according to the invention, the total drawing is thus composed of a slight wet drawing and subsequent more extensive drawing. As a rule, the latter is carried out in the usual manner at an elevated temperature on drawing units, in which single-stage or multi-stage drawing takes place between two godet rolls running at different circumferential speeds.

In order to heat the filaments to be required drawing temperature, contact drawing can be carried out, in which the filaments are pulled over hot plates ("pressing irons") fitted in the drawing region of the drawing unit, which have surface temperatures from 280° C. to 480° C., preferably 340° C. to 450° C. The filaments are thus drawn in a ratio of 1:4.8 up to about 1:15, preferably 1:5 to 1:13.

A likewise suitable variant of the spinning process is the so-called "dry-spinneret/wet-spinning process", as is described, for example, in US-A-3,414,645. In the latter, spinning takes place from the top downwards and, after leaving the spinneret, the spun filaments first pass through a gaseous medium, preferably air, and enter an aqueous coagulation bath. The further treatment of the filaments thus produced takes place a described above. The shaped articles produced from the raw materials according to the invention, such as, for example, fibers, filaments, fiber pulp or films and sheets, are used, for example, as reinforcing materials for plastics or as industrial materials for filtration and insulation. For insulation purposes, it is also possible to apply a polymer solution as a film to the object which is to be insulated and then to remove the solvent and any solubilizers which may be present.

The examples which follow are intended to serve further clarification of the invention. The proportions of dicarboxylic acid components and diamine components were calculated as 100 mol % in each case.

EXAMPLE 1

Aromatic copolyamide from 100 mol % of terephthaloyl chloride, 50 mol % of 3,3'-dimethylbenzidine, 25 mol % of p-phenylenediamine and 25 mol % of 3,3'-dimethoxybenzidine, 5 percent polymer solution.

233.5 g (1.1 mol) of 3,3'-dimethylbenzidine, 59.5 g (0.55 mol) of p-phenylenediamine, 134.2 g (0.55 mol) of 3,3'-dimethoxybenzidine and 66.5 g of lithium chloride are dissolved under nitrogen in 13,233 g of N-methylpyrrolidone and reacted between 30° C. and 55° C. with 446.6 g (2.2 mol) of powdered terephthaloyl chloride. After a reaction time of 50 minutes, the polycondensation is stopped by addition of solution of 3.4 g of acetyl chloride in about 100 g of N-methylpyrrolidone. The very viscous batch was stirred for a further 15 minutes at about 60° C. and neutralized with 132.4 g of calcium oxide (96%) in the form of a 65% suspension in N-methylpyrrolidone.

The solution contains 5% of copolyamide, 1.7% of calcium chloride and 0.5% of lithium chloride. The dissolved copolyamide has an inherent viscosity of 6.26.

The solution is filtered, degassed and spun by the so-called dry-spinneret/wet-spinning process. For this purpose, it is spun out, at a temperature of 90° C. through a spinneret fitted at a distance of 30 mm vertically above a coagulation bath and having 100 orifices of 0.15 mm diameter each into a coagulation bath composed of an aqueous 35% solution of N-methylpyrrolidone in water of 80° C. at a speed of 16 m/min. The spun filaments obtained are taken off through two water baths, a multi-stage washing machine, over three drying godets at 120° C., 160° C. and 240° C. and finally over a four part hotplate(contact heater) at 360° C., 370° C., 380° C. and 400° C. at a speed of 85.7 m/min.

Here and in the following examples, the multifilament yarn is provided with a protective twist according to $\alpha m = 30$ (DIN 53 832, part 1) and then tested. In this example, the filament denier is 1.77 dtex (DIN 53 830) and the ultimate tenacity together with an ultimate tensile strength elongation of 2.1% is 185 cN/tex (DIN 53 834, part 1). The modulus is 94 N/tex. The modulus is calculated from the slope of the tenacity/elongation diagram between 0.3 and 0.5% elongation.

If, in place of p-phenylenediamine, the equivalent quantity of 2-methyl-1,4-diaminobenzene is used and the procedure following in other respects is as described above, a fiber material is likewise obtained which, at a reduced but still adequate tenacity, has a very good initial modulus of 83 N/tex.

EXAMPLE 2

Aromatic copolyamide from 100 mo. % of terephthaloyl chloride, 50 mol % of 3,3'-dimethylbenzidine, 25 mol % of p-phenylenediamine and 25 mol % of 3,3'-dimethoxybenzidine, 6 percent of polymer solution.

254.8 g (1.2 mol) of 3,3'-dimethylbenzidine, 64.9 g (0.6 mol) of p-phenylenediamine, 146.6 g (0.6 mol) of 3,3-dimethoxybenzidine and 90.7 g of anhydrous calcium chloride are dissolved under nitrogen in 11,825 g of n-methylpyrrolidone.

In the course of 60 minutes, 490.2 g of powdered terephthaloyl chloride are added at temperatures between 29.6 and 57.3° C. After 60 minutes, the polycondensation is stopped by addition of 3.8 g of acetyl chloride—diluted with about 100 g of n-methylpyrrolidone.

Stirring is continued for 10 minutes at about 60° C. and the mixture is neutralized with 223 g of a 65% suspension of 96% calcium oxide in N-methylpyrrolidone.

The solution contains 6% of copolyamide and 2.7% of calcium chloride. The copolyamide has an inherent viscosity of 7.5. The solution is filtered, degassed and spun by a dry-spinneret/wet-spinning process (cf. Example 1).

Temperature of the spinning solution: 120° C.
Spinneret/coagulation bath distance: 20 mm
Spinneret: 100 orifices of 0.15 mm diameter each
Coagulation bath: 35% N-methylpyrrolidone/water at 80° C.
Take-off speed: 60 m/minute
Drying godets: 120°, 160°, 240° C.
Hotplate temperature: 450° C.
Take-off speed: 120 m/minute The filament denier is 1.81 dtex, the tenacity is 156 cN/tex, the elongation is 1.9% and the initial modulus is 89 1 N/tex.

EXAMPLE 3

Aromatic copolyamide from 100 mol % of terephthaloyl chloride, 50 mol % of 3,3'-dimethylbenzidine, 25 mol % of p-phenylenediamine and 25 mol % of 3,3'-dimethoxybenzidine, 6.5 percent polymer solution.

A solution of 276.0 g (1.3 mol) of 3,3'-dimethylbenzidine, 70.3 g (0.65 mol) of p-phenylenediamine, 158.8 g (0.65 mol) of 3,3'-dimethoxybenzidine and 120 g of anhydrous calcium chloride is 11,709 g of N-methylpyrrolidone is polycondensed with 527.85 g (2.6 mol) of powdered terephthaloyl chloride as in Examples 1 and 2.

After stopping with 4.1 g of acetyl chloride and neutralizing with 241 g of calcium oxide suspension in N-methylpyrrolidone (65% CaO), this give a very viscous polymer solution.

Copolymer content: 6.5%
Calcium chloride content: 3.15 %
Inherent viscosity of the copolyamide: 6.86 dl/g.

The solution is filtered and degassed. The dry-spinneret/wet-spinning process is carried out under the following conditions:

Temperature of the spinning solution: 110° C.
Spinneret/coagulation bath distance: 40 mm
Spinneret: 100 orifices of 0.15 mm diameter each
Coagulation bath: 50% N-methylpyrrolidone/water at 6020 C.
Take-off speed: 16 m/minute
Drying godets: 120°, 160°, 240° C.
Hotplate temperature: 400°–420° C.
Take-off speed: 152.8 m/minute.

The filament denier is 2.69 dtex, the tenacity is 153 cN/tex, the elongation is 1.9% and the initial modulus is 88 N/tex.

EXAMPLE 4

Aromatic copolyamide from 100 mol % of terephthaloyl chloride, 40 mol % of 3,3'-dimethylbenzidine, 30 mol % of p-phenylenediamine and 30 mol % of 3,3'-dimethoxybenzidine.

186.8 g (0.88 mol) of 3,3'-dimethylbenzidine, 71.3 g (0.66 mol) of p-phenylenediamine, 161.2 g (0.66 mol) of 3,3'-dimethoxybenzidine and 70.5 g of anhydrous calcium chloride are dissolved in 13,078 g of N-methylpyrrolidone and the solution is reacted between 30.1° C. and 55.3° C. with 446.6 g (2.2 mol) of terephthaloyl chloride in the course of 38 minutes.

The reaction is stopped with 3.5 g of acetyl chloride and the mixture is neutralized with 204 g of calcium oxide suspension (65% of CaO).

The solution contains 5% of copolyamide and 2.2% of calcium chloride. The inherent viscosity of the dissolved polymer is 8.29. The filtered and degassed solution is subjected to a dry-spinneret/wet-spinning process under the following conditions:

Temperature of the spinning solution: 120° C.
Spinneret/coagulation bath distance: 40 mm
Spinneret: 100 orifices of 0.15 mm diameter each
Coagulation bath: 35% N-methylpyrrolidone/water at 80° C.
Take-off speed: 14 m/minute
Drying godets: 120°, 160°, 240° C.
Hotplate temperature: 400°–420° C.
Take-off speed: 180.6 m/minute.

The filament denier is 1.6 dtex, the tenacity is 176 cN/tex, the elongation is 2.1% and the initial modulus is 91 N/tex.

EXAMPLE 5

Aromatic copolyamide from 100 mol % of terephthaloyl chloride, 45 mol % of 3,3'-dimethylbenzidine, 25 mol % of p-phenylenediamine and 30 mol % of 3,3'-dimethoxybenzidine.

A solution of 248.4 g (1.17 mol) of 3,3'-dimethylbenzidine, 70.3 g (0.65 mol) of p-phenylenediamine and 190.5 g (0.78 mol) of 3,3'-dimethoxybenzidine in 12,888 g of N-methylpyrrolidone s reacted with 526.3 g of powdered terephthaloyl chloride. The polycondensation takes lace between 30.3° and 54.2° C. in the course of 32 minutes. Five minutes after the addition of acid chloride, 84.7 g of anhydrous calcium chloride are added.

The polycondensation is stopped with 4.1 g of acetyl chloride, the reaction is allowed to continue for 10 minutes at about 55° C. and the mixture is neutralized with 241 g of calcium oxide suspension (65% in N-methylpyrrolidone).

The solution contains 6% of copolyamide and 2.65% of calcium chloride. The inherent viscosity of the dissolved polymer is 7.63.

The filtered and degassed solution is spun by a wet-spinning process. For this purpose, it is spun out from a spinneret having 100 orifices of 0.15 mm diameter each into a horizontally arranged coagulation bath, composed of a warm solution of 35% of N-methylpyrrolidone in water at 60° C., at a speed of 16 m/minute. The filament runs through washing baths, drying godets (120°, 160° and 240° C.) and finally over a hotplate at temperatures of 380°–410° C. and is taken off at 77.7 m/minute.

The filament denier is 1.99 dtex, the tenacity is 122 cN/tex, the elongation is 1.5% and the initial modulus is 85 N/tex.

EXAMPLE 6

Aromatic copolyamide from 85 mol % of terephthaloyl chloride, 15 mol % of chloroterephthaloyl chloride, 25 mol % of p-phenylenediamine, 60 mol % of 3,3'-dimethylbenzidine and 15 mol % of 3,3'-dimethoxybenzidine.

101.9 g (0.48 mol) of 3,3'-dimethylbenzidine,
21.6 g (0.2 mol) of p-phenylenediamine and 29.3 g (0.12 mol) of 3,3'-dimethoxybenzidine are dissolved in 3,997 g of N-methylpyrrolidone and reacted at temperatures between 15° and 68° C. in the course of 25 minutes with a mixture of 138.05 g of terephthaloyl chloride and 28.5 g of chloroterephthaloyl chloride. After 1 hour further stirring time, the mixture is neutralized with 74 g of a calcium oxide suspension (65% of calcium oxide in N-methylpyrrolidone).

The solution contains 6% of copolyamide and 2.0% of calcium chloride. The inherent viscosity of the copolyamide is 5.84.

The filtered and degassed solution is wet-spun:
Temperature of the spinning solution: 100° C.
Spinneret: 100 orifices of 0.15 mm diameter each
Coagulation bath: 35% N-methylpyrrolidone/water at 80° C.
Take-off speed: 16 m/minute
Drying godets: 120°, 160°, 240° C.
Hotplate temperature: 340°-380° C.
Take-off speed: 69.5 m/minute.

The filament denier is 1.81 dtex, the tenacity is 131 cN/tex, the elongation is 1.7% and the initial modulus is 84 N/tex.

EXAMPLE 7

Aromatic copolyamide from 100 mol % of terephthaloyl chloride, 25 mol % of p-phenylenediamine, 50 mol % of 3,3'-dimethylbenzidine, 15 mol % of dimethoxybenzidine and 10 mol % of 3,4'-diaminobenzanilide.

A solution of 17.3 g (0.16 mol) of p-phenylenediamine, 67.9 g (0.32 mol) of 3,3'-dimethylbenzidine, 23.45 g (0.096 mol) of 3,3'-dimethoxybenzidine, 14.5 g (0.064 mol) of 3,3'-diaminobenzanilide and 20.6 g of calcium chloride in 3,822 g of N-methylpyrrolidone is reacted in the course of 65 minutes at temperatures between 13.2° and 63° C. with 130.4 g of powdered terephthaloyl chloride.

The mixture is neutralized with 59.2 g of a 65% CaO suspension in N-methylpyrrolidone.

The solution contains 5% of copolyamide and 2.2% of calcium chloride. The inherent viscosity of the copolyamide is 5.46.

The filtered and degassed solution is wet-spun:
Temperature of the spinning solution: 100° C.
Spinneret: 100 orifices of 0.15 mm diameter each
Coagulation bath: 35% N-methylpyrrolidone/water at 60° C.
Take-off speed: 16 m/minute
Drying godets: 120°, 160°, 240° C.
Hotplate temperature: 360°-380° C.
Take-off speed: 126.3 m/minute.

The filament denier is 1.97 dtex, the tenacity if 162 cN/tex, the elongation is 2.3% and the initial modulus is 79 N/tex.

COMPARATIVE EXPERIMENT 1

Aromatic copolyamide from 100 mol % of terephthaloyl chloride, 25 mol % of 3,3'-dimethylbenzidine, 25 mol % p-phenylenediamine and 50 mol % of 3,3'-dimethoxybenzidine.

61.0 g (0.25 mol) of 3,3'-dimethoxybenzidine, 13.4 g (0.125 mol) of p-phenylenediamine, 26.5 g (0.125 mol) of 3,3'-dimethylbenzidine and 16.6 g of anhydrous calcium chloride are dissolved in 3,912 g of N-methylpyrrolidone. In the course of 50 minutes, 101.5 g of powdered terephthaloyl chloride are added between 15.1° and 61.3° C. The solution is neutralized with 30.7 g of calcium oxide (96%).

The solution contains 4% of copolyamide and 1.8% of calcium chloride. The inherent viscosity of the dissolved polymer is 7.43.

The filtered and degassed solution is spun in a wet-spinning process under the following conditions:
Temperature of the spinning solution: 90° C.
Spinneret: 50 orifices of 0.15 mm diameter each
Coagulation bath: 35% N-methylpyrrolidone/water at 60° C.
Take-off speed: 15.9 m/minute
Drying godets: 160° C, 180° C.
Hotplate temperature: 300°-340° C.
Take-off speed: 60.5 m/minute.

The filament denier is 2.72 dtex, the tenacity is 108 cN/tex, the elongation is 2.1% and the initial modulus is 69 N/tex.

COMPARATIVE EXPERIMENT 2

Aromatic copolyamide from 100 mol % of terephthaloyl chloride, 20 mol % of p-phenylenediamine, 20 mol % of 3,3'-dimethylbenzidine and 60 mol % of 3,3'-dimethoxybenzidine.

7.8 g (0.072 mol) of p-phenylenediamine, 15.3 g (0.72 mol) of 3,3'-dimethylbenzidine, 52.65 g (0.216 mol) of 3,3'-dimethoxybenzidine and 24.5 g of lithium chloride are dissolved in 2,264 g of N-methylpyrrolidone and reacted at 10° to 75° C. in the course of 50 minutes with 74.68 g of powdered terephthaloyl chloride. The mixture is neutralized with 22.1 g of calcium oxide (96%).

The solution contains 5% of copolyamide, 1.6% of calcium chloride and 1.0% of lithium chloride. The inherent viscosity of the copolyamide is 5.30.

The filtered and degassed solution is subjected to a wet-spinning process under the following conditions:
Temperature of the spinning solution: 80°C.
Spinneret: 50 orifices of 0.10 mm diameter each
Coagulation bath: 35% N-methylpyrrolidone/water at 80° C.
Take-off speed: 16 m/minute
Drying godets: 160° C, 180° C.
Hotplate temperature: 330°-370° C.
Take-off Speed: 91.7 m/minute.

The filament denier is 1.86 dtex, the tenacity is 85 cN/tex, the elongation is 1.6% and the initial modulus is 65 N/tex.

COMPARATIVE EXPERIMENT 3

Aromatic copolyamide from 100 mol % of terephthaloyl chloride, 15 mol % of p-phenylenediamine, 25 mol % of 3,3'-dimethylbenzidine and 60 mol % of 3,3'-dimethoxybenzidine.

9.7 g (0.09 mol) of p-phenylenediamine, 31.8 g (0.15 mol) of 3,3'-dimethylbenzidine, 87.8 g (0.36 mol) of 3,3'-dimethylbenzidine and 20.4 g of calcium chloride are dissolved in 3,854 g of N-methylpyrrolidone.

The solution is reacted in the course of 35 minutes between 13.4° and 57° C. with 121.8 g of terephthaloyl chloride. The mixture is neutralized with 36.8 g of calcium oxide (96%).

The solution contains 5% of copolymer and 2.1% of calcium chloride. The inherent viscosity of the copolyamide is 6.98.

The filtered and degassed solution is wet-spun under the following conditions:
Temperature of the spinning solution: 90° C.
Spinneret: 50 orifices of 0.10 mm diameter each
Coagulation bath: 35% N-methylpyrrolidone/water at 60° C.
Take-off speed: 16 m/minute
Drying godets: 160°, 180° C.

Hotplate temperature: 320°-360° C.
Take-off speed: 55.4 m/minute.

The filament denier is 2.9 dtex, the tenacity is 87 cn/tex, the elongation is 1.8% and the modulus is 63 N/tex.

We claim:

1. An aromatic copolyamide, soluble in organic polyamide solvents, which comprises at least 95 mol % of recurrent structural units of the formulae

  A

  B

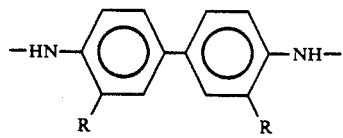  C

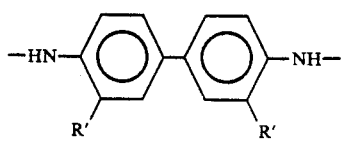  D and up to 5 mol % of structural units E or F or combinations thereof which contain m-bonds and are derived from aromatic dicarboxylic acids (E') or from aromatic diamines (F') or combinations thereof, the totals of the mol fractions of the structural units A+E and of the mol fractions of the structural units B+C+D+F being substantially the same, —Ar— and —Ar'— being divalent aromatic radicals other than biphenylene, the valency bonds of such are in the para- position or in a comparable coaxial or parallel position and which are optionally substituted by one or two inert radicals.

—R and —R' being different from one another and being lower alkyl radicals or lower alkoxy radicals, and the fractions of the diamine components B, C and D relative to the total quantity of these diamine components being inside the following limits:
structural unit B: 20-30 mol %
structural unit C: 35-55 mol %,
structural unit D: 15-40 mol %.

2. A copolyamide as claimed in claim 1, wherein —Ar— is 1,4-phenylene, 1,4-, 1,5- or 2,6-naphthylene and
—Ar'— is 1,4-phenylene or 1,4-, 1,5- or 2,6-naphthylene.

3. A copolyamide as claimed in claim 1, wherein —Ar— and —Ar'— are 1,4-phenylene radicals which are unsubstituted or substituted by a lower alkyl radical or by a halogen atom.

4. A copolyamide as claimed in claim 1, wherein —Ar— and —Ar'— are 1,4-phenylene radicals which are unsubstituted or substituted by a methyl group or a chlorine atom.

5. A copolyamide as claimed in claim 1, wherein —Ar— and —Ar'— are unsubstituted 1,4-phenylene radicals.

6. A copolyamide as claimed in claim 1, wherein
—R is a lower alkyl radical and
—4' is a lower alkoxy radical.

7. A copolyamide as claimed in claim 1, wherein —R is methyl and —R' is methoxy.

8. A copolyamide as claimed in claim 1, wherein the structural unit containing m-bonds is the divalent radical of 3,4'- or 3',4-diaminobenzanilide.

9. A copolyamide as claimed in claim 1, wherein the fractions of the diamine components B, C and D relative to the total quantity of diamine components are inside the following limits:
diamine B: 25-30 mol %
diamine C: 40-50 mol %
diamine D: 25-30 mol %.

10. A process for preparing an aromatic copolyamide of claim 1, by polycondensation of a dicarboxylic acid chloride with aromatic diamines in a known polyamide solvent, optionally in the presence of an alkali metal halide or alkaline earth metal halide, at an elevated temperature, which comprises reacting 95 to 100 mol % of acid chlorides of the formula

 (A')

and 0 to 5 mol % of aromatic dicarboxylic acid dichlorides (E') containing m-bonds with an equivalent quantity of a diamine mixture composed of 95-100 mol % of a mixture of diamines containing 20-30 mol % of diamines in the formula

 (B')

35-55 mol % of diamines of the formula

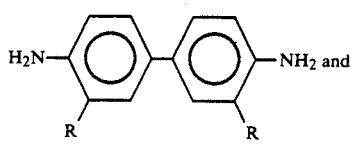 (C')

15-40 mol % of diamines of the formula

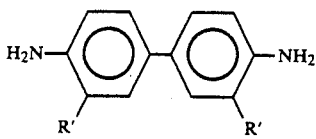 (D')

and of 0 to 5 mol % of diamines (F') containing m-bonds.

11. The process as claimed in claim 10, wherein a mixture of diamines is reacted which has the following compositions:
25-30 mol % of B',
40-50 mol % of C',
25-30 mol % of D'.

12. Shaped structure of the copolyamide of claim 1.

* * * * *

UNITED STATES PATENT AND TRADEMARK OFFICE
CERTIFICATE OF CORRECTION

PATENT NO. : 4,987,217
DATED : JANUARY 22, 1991
INVENTOR(S) : GUNTER KEIL, ET AL.

It is certified that error appears in the above-identified patent and that said Letters Patent is hereby corrected as shown below:

Column 1, Line 8, "the," should read -- them -- .

Column 1, Lines 63-64, "metao-rientation" should read -- meta-orientation -- .

Column 2, Line 40, "not bee" should read -- now been -- .

Column 5, Line 21, "50/154/522" should read -- 50/154,522 -- .

Column 7, Line 13, "process" should read -- processed -- .

Column 7, Line 42, "be" should read -- the -- .

Column 7, Line 47, "480°" should read -- 460° -- .

Column 7, Line 57, "a" should read -- as -- .

Column 8, Line 49, "following" should read -- followed -- .

Column 8, Line 55, "mo. %" should read -- mol. % -- .

UNITED STATES PATENT AND TRADEMARK OFFICE
CERTIFICATE OF CORRECTION

PATENT NO. : 4,987,217
DATED : JANUARY 22, 1991
INVENTOR(S) : GUNTER KEIL, ET AL.

It is certified that error appears in the above-identified patent and that said Letters Patent is hereby corrected as shown below:

Column 9, Line 20, "89 1 N/tex" should read -- 89 N/tex -- .

Column 9, Line 36, "give" should read -- gives -- .

Column 9, Line 48, "6020" should read -- 60° -- .

Column 10, Line 30, "s" should read -- is -- .

Column 10, Line 32, "lace" should read -- place -- .

In Claim 1, Column 13, Line 40, "radicals." should read
-- radicals, -- .

In Claim 6, Column 14, Line 6, "4'" should read -- R' -- .

In Claim 10, Column 14, Line 27, the formula for (A')
should read -- Cl-OC-Ar-CO-Cl -- .

UNITED STATES PATENT AND TRADEMARK OFFICE
CERTIFICATE OF CORRECTION

PATENT NO. : 4,987,217

DATED : JANUARY 22, 1991

INVENTOR(S) : GUNTER KEIL, ET AL.

It is certified that error appears in the above-identified patent and that said Letters Patent is hereby corrected as shown below:

In Claim 10, Column 14, Line 33, "in the formula" should read

-- of the formula -- .

Signed and Sealed this

Eleventh Day of August, 1992

*Attest:*

DOUGLAS B. COMER

*Attesting Officer*     *Acting Commissioner of Patents and Trademarks*